Dec. 10, 1968   C. F. ERIKSON   3,414,967
TOOL CHANGER
Filed June 30, 1967   7 Sheets-Sheet 4

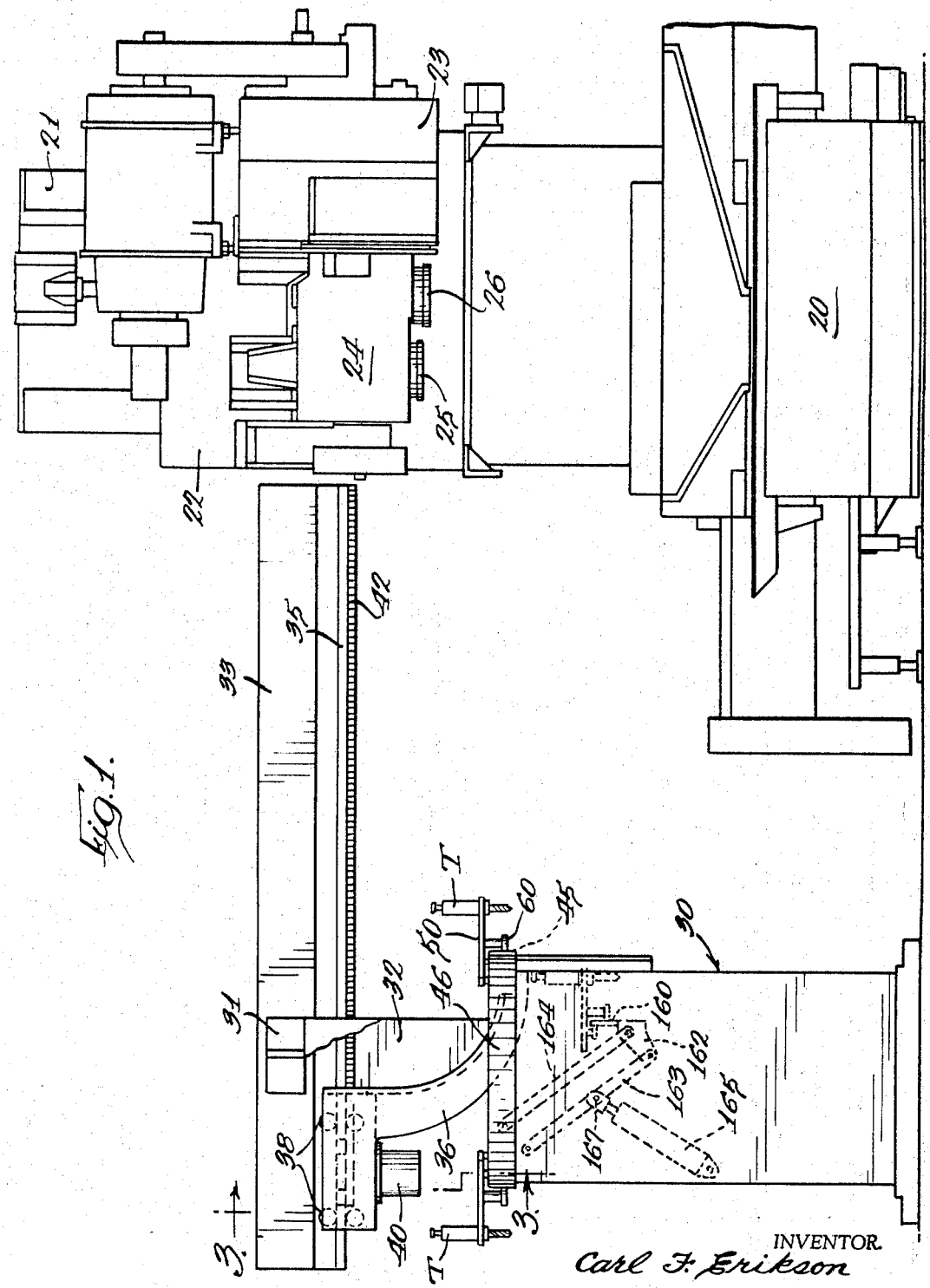

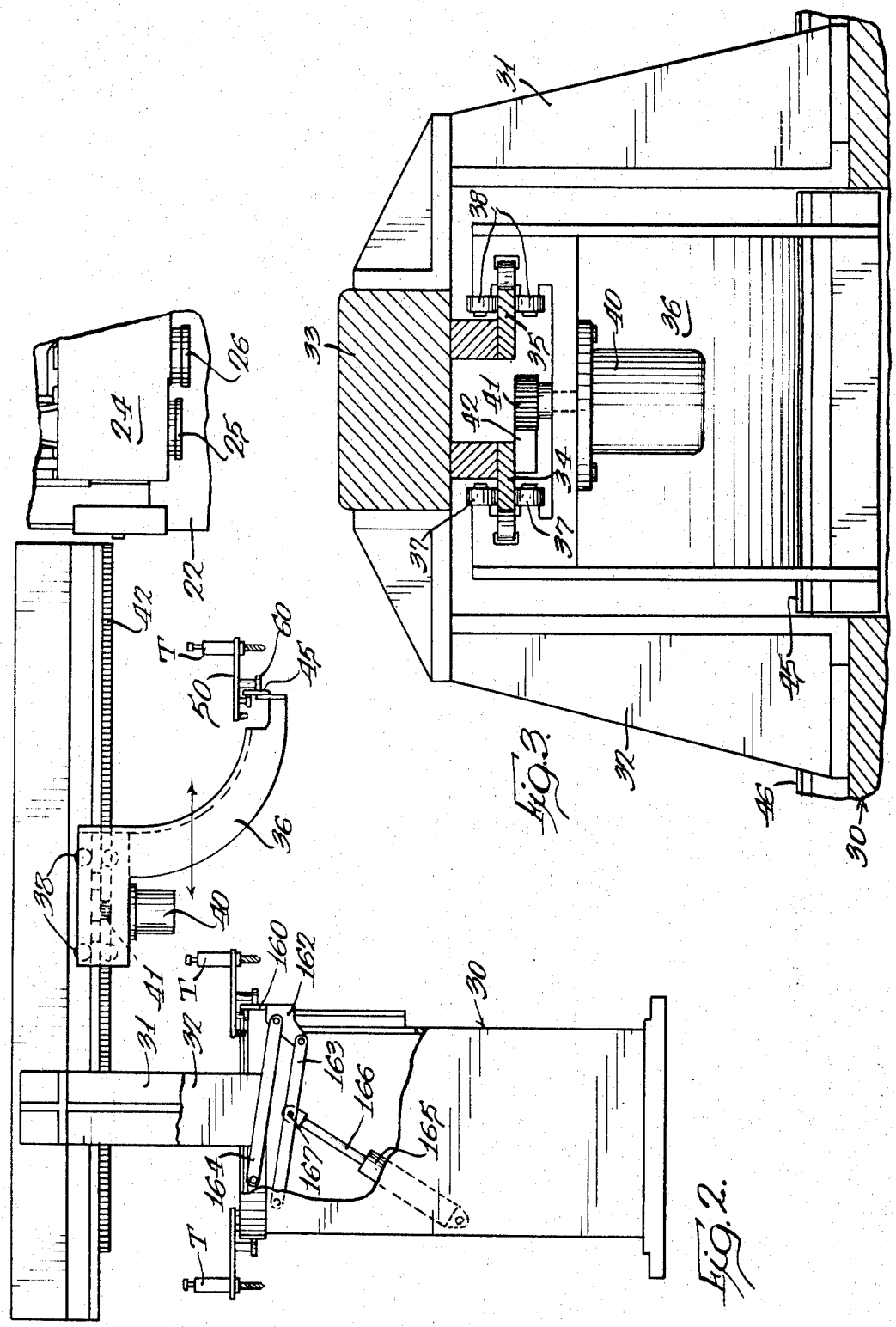

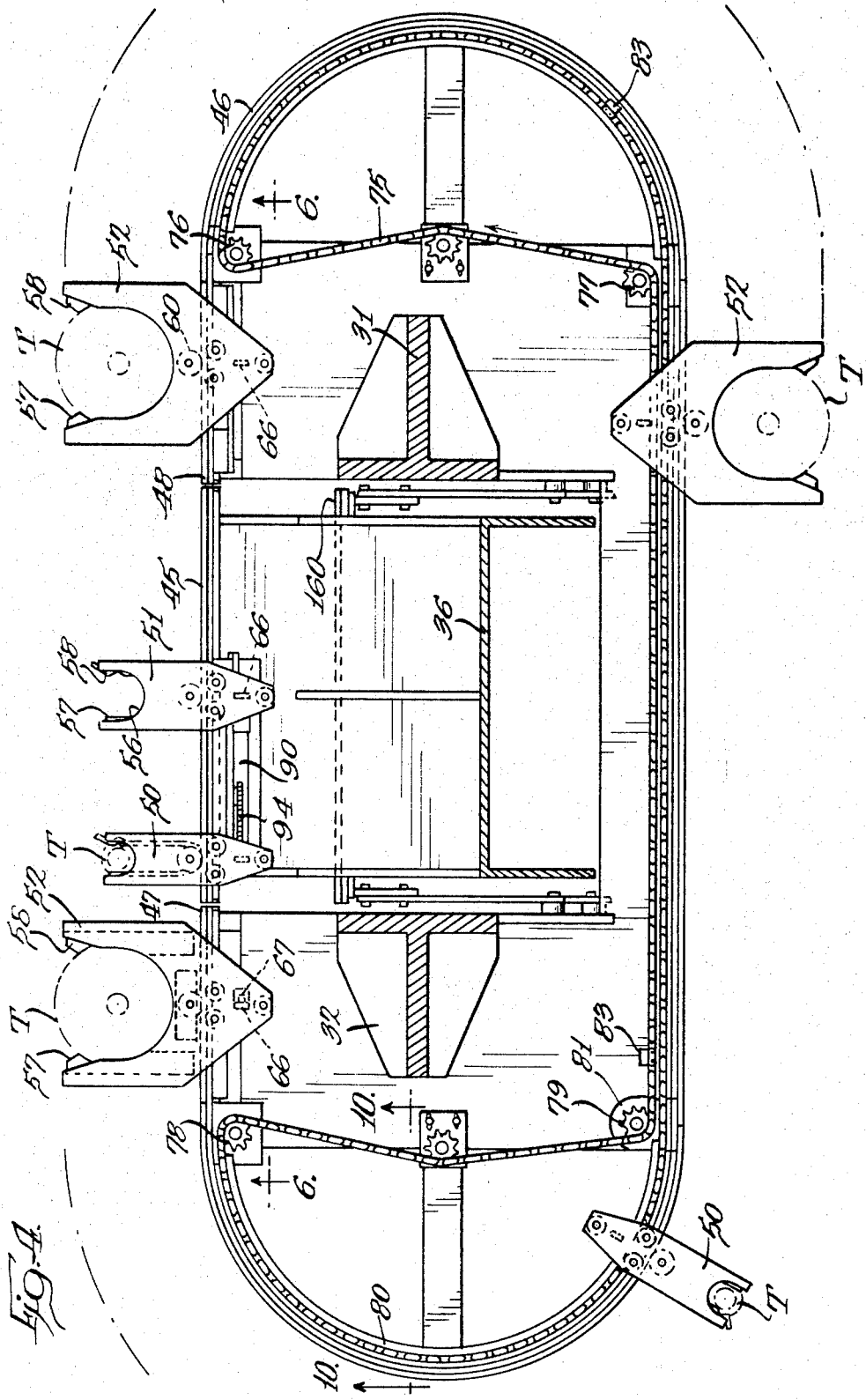

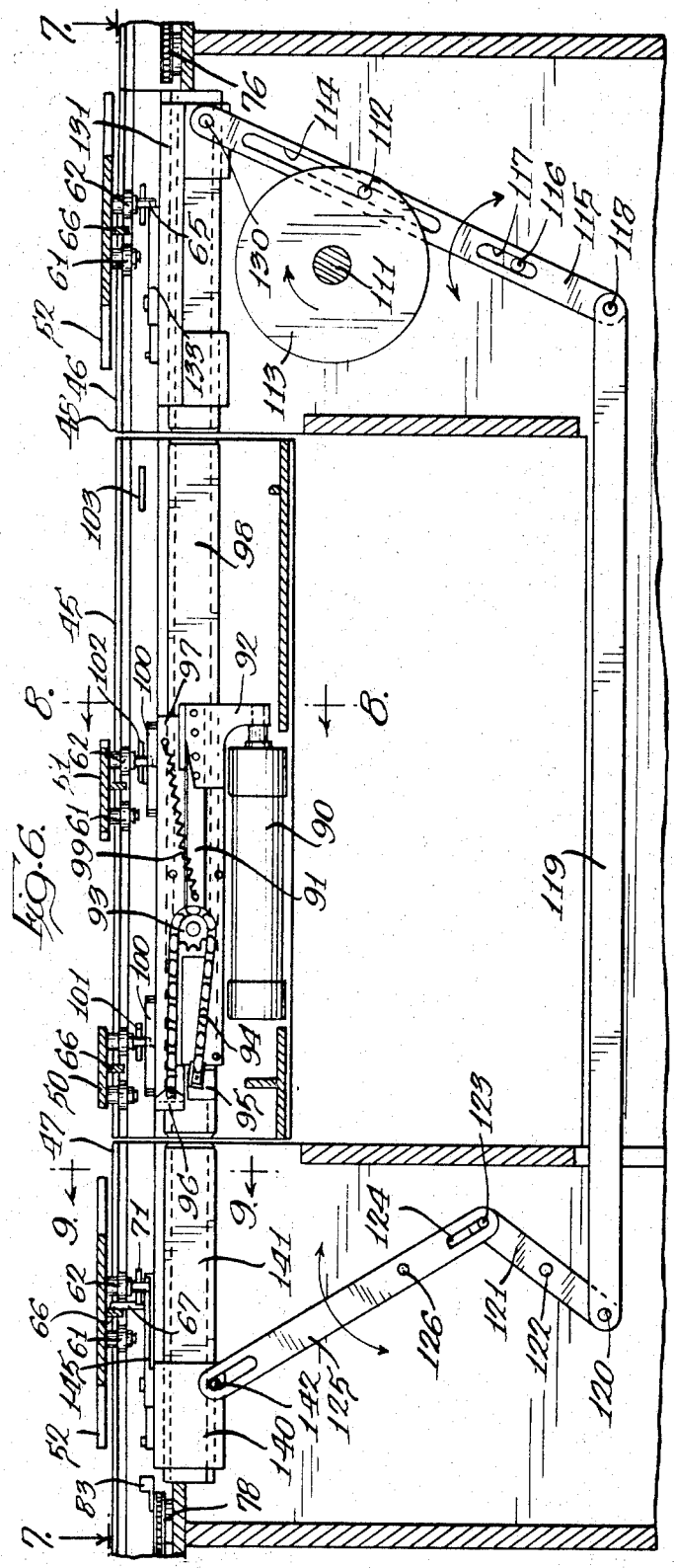

Dec. 10, 1968   C. F. ERIKSON   3,414,967
TOOL CHANGER
Filed June 30, 1967   7 Sheets-Sheet 6
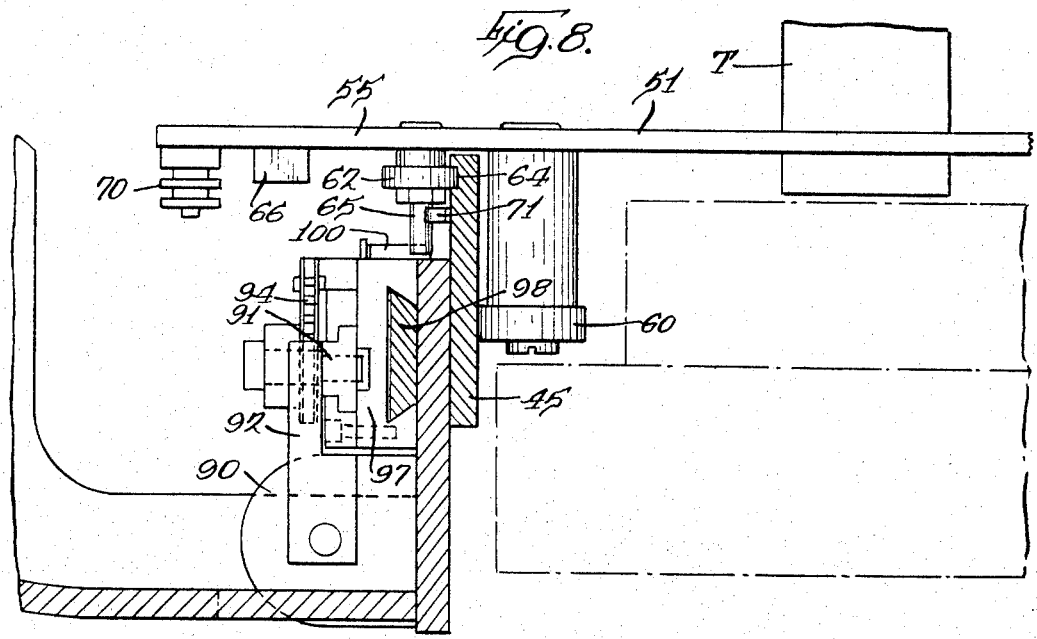

Dec. 10, 1968  C. F. ERIKSON  3,414,967
TOOL CHANGER

Filed June 30, 1967  7 Sheets-Sheet 7

United States Patent Office 3,414,967
Patented Dec. 10, 1968

3,414,967
TOOL CHANGER
Carl F. Erikson, Belvidere, Ill., assignor to Sundstrand Corporation, a corporation of Delaware
Filed June 30, 1967, Ser. No. 650,398
20 Claims. (Cl. 29—568)

ABSTRACT OF THE DISCLOSURE

A tool changing system having a tool storage magazine with variable capacity and with a section of the magazine being movable from the normal path of tools in the magazine to position a tool adjacent the spindle whereby the tool can be transferred directly from the magazine storage element to the spindle.

---

This invention relates to tool handling mechanism and, more particularly, to a tool changing magazine mechanism for use with a machine tool.

At the present time, several different types of tool changers are known in the art. In one type, a plurality of tools are carried in an indexable magazine and, once the desired tool is located at a transfer position within the magazine, the entire magazine is shifted to a position in alignment with a machine tool spindle and the tool is then transferred from the magazine to the spindle. This tool selection occurs after the used tool has been returned to the magazine. In this type, the search for the next tool to be used must be conducted while the spindle is idle and then the next selected tool is ready for transfer the entire magazine must be shifted into position of alignment with the spindle. In another type, the magazine is indexed to find the proper tool and the tool is then removed from the magazine and transferred to the spindle by an intermediate transfer mechanism which, at the same time, removes a prior used tool from the spindle. This type requires a location of the magazine at a position closely adjacent the machine tool spindle and, thus, limits the size of the magazine and encumbers the space surrounding the machine tool. A third type overcomes these disadvantages by having the magazine remotely located and then having additional transfer mechanism for moving the tool to and from the magazine to the tool transfer position.

These types require either the moving of an entire, heavy, bulky magazine with tools, the utilization of valuable space, or the addition of a large amount of tool transfer mechanism.

An object of this invention is to provide a tool changing system of a new and improved construction overcoming the deficiencies of prior devices and having a magazine with substantially unlimited capacity and which is reliable and inexpensive due to the simplified construction thereof.

Another object of this invention is to provide a tool changing system having a tool storage magazine including a plurality of magazine elements, one with each tool, which provide for movable tool storage in the magazine and, additionally, function as an extendable support for carrying a tool to a machine tool spindle.

Still another object of the invention is to provide a tool changing system which can have substantially unlimited capacity and, thus, renders feasible a sequential tool loading system in which tools are located in the magazine in the order in which they will be used with resultant avoidance of a tool coding system and resultant cost of such coding and code reading system, as well as eliminating time delays in searching for the next tool to be used in a machining operation. A further advantage of the tool changing system is in the substantial elimination of damaged workpieces and time losses resulting from man-error which occurs with a magazine of limited capacity in which the proper tool is not present or must be exchanged within the magazine with other tools that have previously been used and are no longer required.

A further object of the invention is to provide a tool changing system for use with a machine tool in which the magazine has a plurality of shuttle cars movable along a rail by means of a power indexing system, the rail having a movable rail member at a tool transfer station with the desired tool in its car at said station being moved to the location of the spindle by shift of the movable rail member, the movable rail member carrying at least two cars whereby one car can receive a previously-used tool from the spindle, and means for shifting the pair of cars on the rail member to place the car with the replacement tool in proper relation with the spindle, whereby only a limited part of the magazine is shifted at high speed to and from the spindle for fast changing of tools.

Further objects and advantages will become apparent from the following detailed description taken in connection with the accompanying drawings in which:

FIG. 1 is a front elevational view of the tool changer, shown in association with a machine tool with the upper part broken away;

FIG. 2 is a fragmentary view, similar to FIG. 1, showing the transfer arm of the tool changer in an intermediate position and with an auxiliary rail member in operative position;

FIG. 3 is a vertical section, on an enlarged scale, taken generally along the line 3—3 in FIG. 1;

FIG. 4 is a plan view of the magazine of the tool changer and with frame parts in section as well as parts of the transfer arm;

FIG. 6 is a vertical section, on an enlarged scale, taken generally along the line 6—6 in FIG. 4;

FIG. 7 is a plan section, taken generally along the line 7—7 in FIG. 6;

FIG. 8 is a vertical section, on a further enlarged scale, taken generally along the line 8—8 in FIG. 6;

FIG. 9 is a fragmentary section, taken generally along the line 9—9 in FIG. 6.

Figure 5:
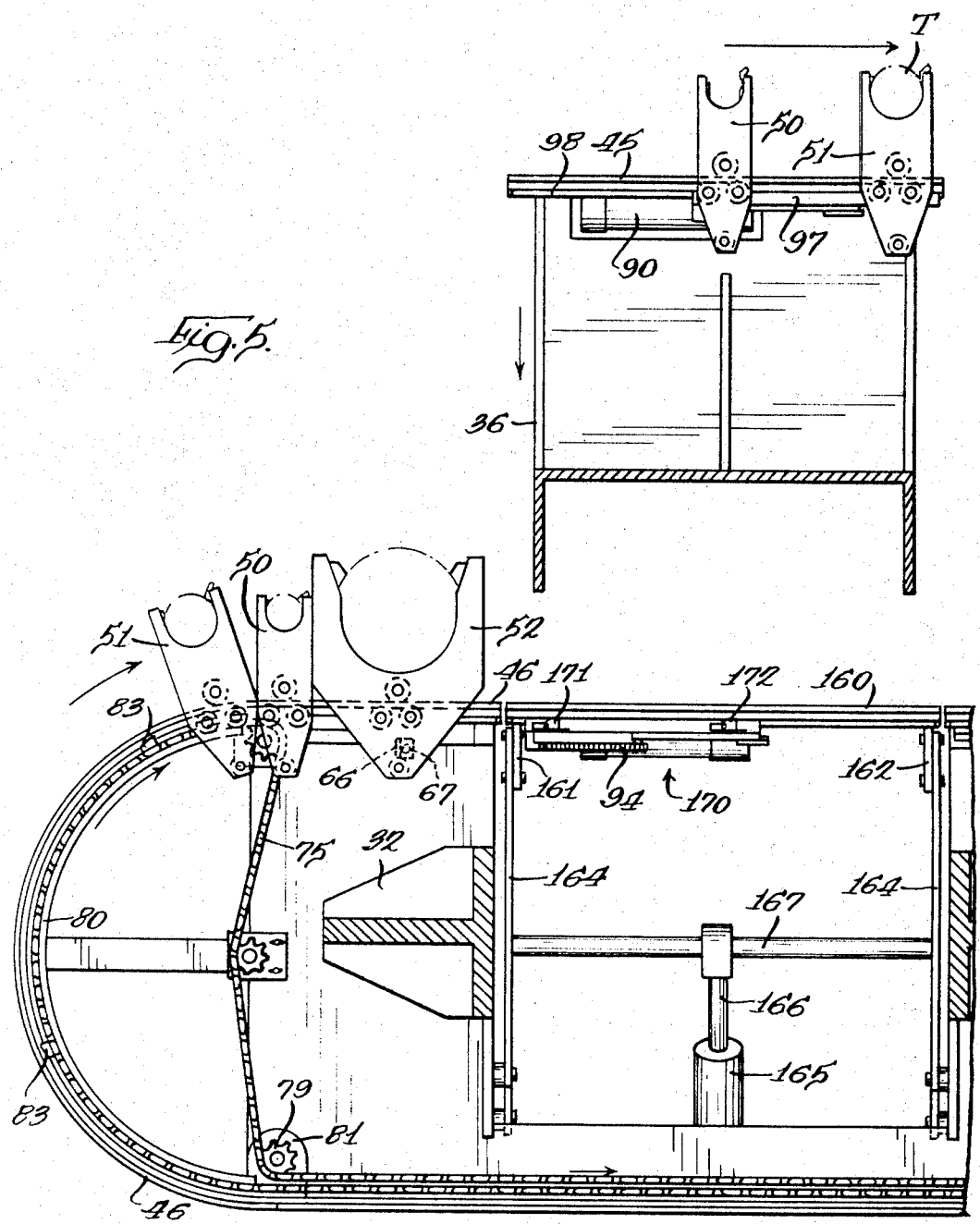
FIG. 5 is a view, similar to FIG. 4, showing the movable rail member of the magazine away from the tool transfer station and with an auxiliary rail member in operative position.
Figure 10:
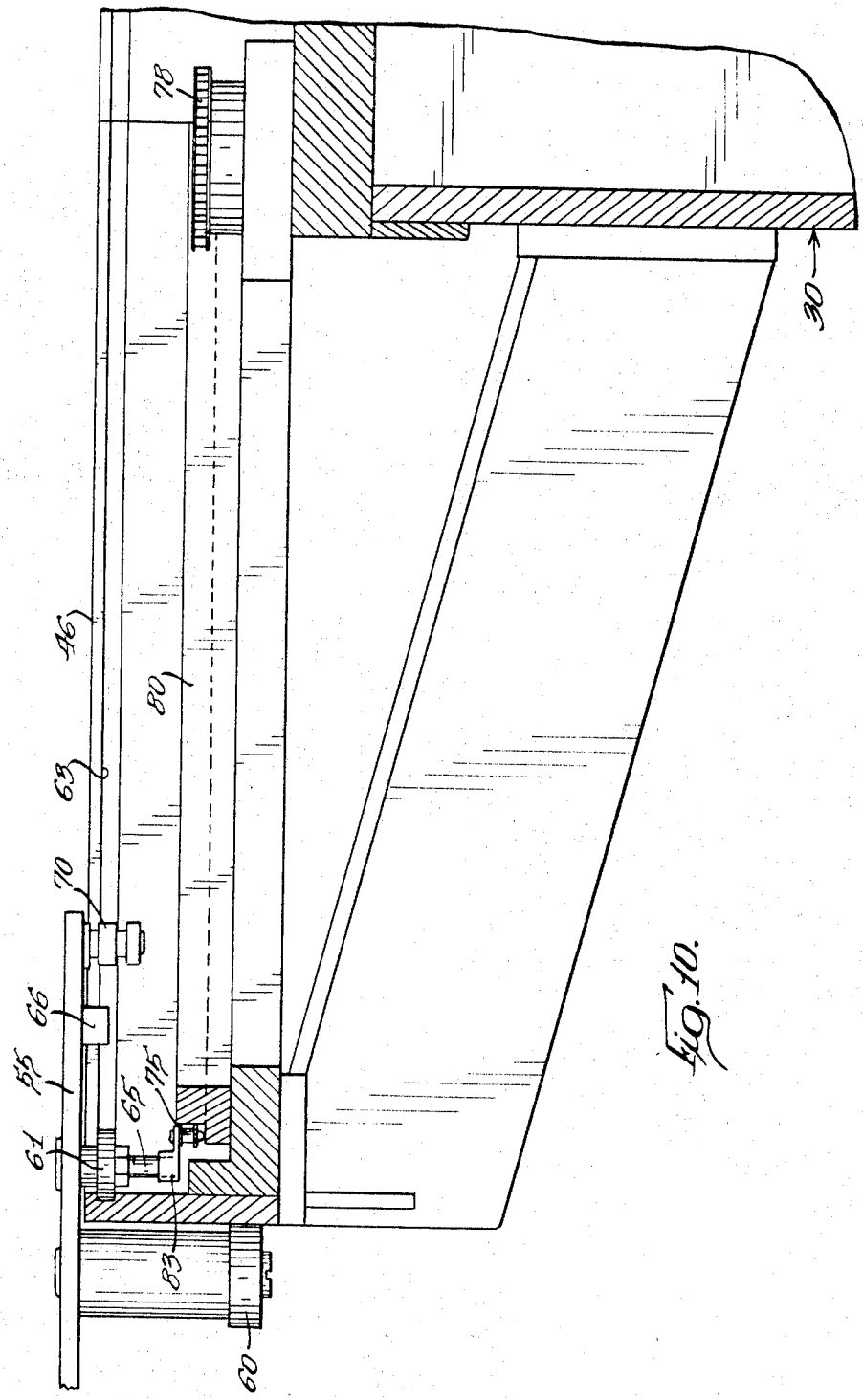
FIG. 10 is a vertical section, taken generally along the line 10—10 in FIG. 4.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

A machine tool is shown generally in FIG. 1 for illustrative purposes and has a bed 20, with an upstanding column at 21 at one end thereof. A vertical saddle 22 carries a transmission head 23 on which a spindle head 24 is mounted, with the spindle head having a pair of spindles 25 and 26. The saddle 22 can be moved vertically along the column to various heights for machining. The saddle is at the elevation shown in FIG. 1 to place the spindles 25 and 26 in a position to function in a tool changing operation. This elevation is shown for spindle 25 in FIG. 2. Additionally, the bed 20 carries movable saddle and table structure on which a workpiece is mounted for presenting a desired surface of the workpiece to a tool carried in one of the spindles.

The tool changer is shown generally in FIGS. 1 and 2 and comprises a pedestal, indicated generally at 30, with a pair of spaced-apart uprights 31 and 32 above the base thereof, which mount an overhead track 33 extending from a position overlying the pedestal to a position adjacent the machine tool. As shown in FIG. 3, the track 33 has a pair of track members 34 and 35 on the underside thereof, extending along the length thereof, with a tool transfer arm 36 supported from these tracks. The arm carries, at its upper end, a plurality of rollers 37 coacting with the top and bottom of track member 34 and a plurality of rollers 38 coacting with the top and bottom of track member 35, which movably mount the arm on the track. The arm is moved along the track by means of a power drive including a motor 40 which drives a gear 41 in mesh with a rack 42 extending along the track 33. The arm 36 is curved, as shown in FIGS. 1 and 2, whereby the lower end thereof extends beyond the end of the track 33 when in tool change position, with the location of the arm on the track 33 being in either of two positions, dependent upon whether a tool is to be changed with respect to either the spindle 25 on the spindle 26. A movable rail member 45 is mounted at the lower end of the arm 36 for a purpose more fully described hereinafter.

The pedestal 30 supports a tool magazine in the form of a horizontal monorail 46, shown particularly in FIGS. 4 and 5, which, in the form disclosed herein, is generally oval and is continuous except for a gap between ends 47 and 48 thereof. This gap is spanned, at certain times, by the movable rail member 45 defining part of the magazine and carried on the tool transfer arm 36. The rail 46 provides support for a number of magazine elements shown as tool-carrying shuttle cars, more particularly described hereinafter, which can move along the rail with a selected car being positioned on the movable rail member 45 for extension from the closed loop of the magazine to a position adjacent one of the machine tool spindles. The magazine rail 46 can have many different shapes and extent, with the controlling factors being the space available and the number of tools to be stored in the magazine.

A number of tool-carrying shuttle cars are disclosed in association with the rail 46. Normally, substantially the entire length of the rail would be occupied by shuttle cars. However, the system will still work if there are a lesser number of cars than needed to completely fill the rail, since there can be excess capacity available.

The shuttle cars are shown particularly in FIGS. 4, 6, 8, 9 and 10. Referring to FIG. 4, three different sizes of shuttle cars are shown at 50, 51 and 52. However, in most systems, two sizes, such as sizes 50 and 52, are adequate for the type of tools carried in the magazine. Although in the preferred embodiment the cars are shown as separate from the tools, a possible variation would be to have the car structure integral with the tool.

In numerically controlled machines, it is common at this time to mount tools in a tool adapter and the car 50 is provided to grip the shank of a cylindrical adapter while the cars 51 and 52 grip a peripheral flange of a flanged adapter, with the different sizing of cars 51 and 52 being provided to handle different flange diameters. Except for the over-all size of the cars, they are identical in construction and embody a base 55 of generally planar form having an open-ended notch 56 to receive the tool, with the axis of the tool extending perpendicular to the plane of the base 55. With the magazine disposed upright, as evident from FIGS. 1 and 2, the tools are held upright and may thus be simply gripped by spring-gripping members 57 and 58, provided within the notch 56 of the car. A number of tools are shown in association with the cars, as identified at T, except that the car 51, shown in FIG. 4, centrally located along the length of the movable rail member 45, does not have a tool for a purpose more fully set forth hereinafter. The various sizes of tool that may be held by a car are shown in outline in FIG. 8.

The cars are mounted on the rail 46 by means of a central roller 60, depending from the car base, and engaging one face of the rail 46. A pair of rollers 61 and 62 depend from the base and roll in a recessed slot 63 in the opposite inner face of the rail 46 which extends along the length of the rail near the top thereof. The movable rail member 45 has the same roller recess indicated at 64 and the rollers 60, 61 and 62 coact with this movable rail member 45 in the same manner as the rail 46.

The mounting of the cars on the rail 46 by means of the depending rollers 60, 61 and 62, provide easy removal and replacement of cars by simply tilting and raising the car from the rail. Once the car is associated with the rail, the overhanging weight at the tool-supporting end, will cause retention of the car in operative relation with the rail 46.

Means are provided on each of the cars for driving engagement by a drive means for moving the cars along the rail 46 and along the movable rail member 45. This means comprises a pin 65 coaxial with the roller 62 of the car and depending downwardly therefrom. This pin is a fixed distance from the center line of a tool held by the car and of the car itself whereby every car and its tool will be located in an accurate position on the movable rail member 45 during tool changing by reference to the pin 65. Additionally, each car carries a depending abutment 66 which functions at a tool-holding station immediately in advance the rail end 47 for engagement by the upwardly extending plunger 67 of a solenoid 68 on the pedestal which holds a car and tool in position preparatory to advance onto the movable rail member 45.

When it is desired to automatically determine the tool carried by the car, a particular display of coding rings 70 can depend from an end of the car with the arrangement being readable by a code reader to identify the tool carried by the car. This system can be used in automatic tool selection and can be used as a checking system with a reader located at the tool-holding station to make certain that the proper tool is present.

The car is held at the tool-holding station additionally by a detent spring 71 mounted on the inner face of the rail 46 and engageable with the depending pin 65 of the shuttle car.

Drive means for moving shuttle cars along the major length of the rail 46 are provided in the form of an endless sprocket chain 75 which passes about four sprockets 76, 77, 78 and 79, which cause the chain to remain clear of a tool transfer station defined by the transfer arm 36 and movable rail 45, when in retracted position, as shown in FIG. 4. At the ends of the oval the chain is caused to follow an arcuate path by moving along arcuate chain guides with the guide at one end of the oval being shown at 80 in FIG. 10.

The chain 75 is driven by means of the sprocket 79 which is driven from a motor and gear reduction unit 81, as shown in FIG. 4. The motor of unit 81 is in circuit to operate continuously. However, a limit switch 82, at the tool-holding station in advance of the rail end 47 and mounted on the rail 46, is in series with the motor and when opened by the presence of a car pin 65 at the tool-holding station, to signify the presence of a tool, stops the motor until the limit switch again closes. The movement of the chain 75 is transmitted to the shuttle cars by means of a series of drive dogs 83 which are connected to the chain at spaced points along its length. There are a lesser number of dogs than shuttle cars, whereby a number of cars, but not all, will be engaged, with intermediate cars abutting driven cars and being advanced thereby. Because the function of the drive chain 75 is to keep all cars moving in a clockwise path, as viewed in FIG. 4, and to take up any gaps, it is necessary to have the drive dogs yieldably engageable with the driving pins 65 of the shuttle cars. For this purpose, the drive dogs are pivotally mounted and spring loaded, so that under a certain amount of force they can yield and merely snap past drive pins 65 of the cars until such time as the presence of a car at the tool-holding station operates the limit switch 82 to stop the drive motor for the chain.

As previously described, a tool extension station is located in the space between the rail end 47 and 48 and is the station at which the tool transfer arm 36 is located in one position to have the movable magazine rail member 45 carried thereby function as a continuation of the rail 46 to form a closed loop. This relation is shown in FIG. 4, with the shuttle cars 50 and 51 located preparatory to an operation in which the shuttle car 51 will receive a tool presently in use in one of the spindles 25 or 26 and a replacement tool is carried in the shuttle car 50. A subsequent point in the operation is shown in FIG. 5 in which the transfer arm 36 is away from the tool extension station and a tool change operation has been substantially completed.

Means are associated with the tool transfer arm 36 for shifting the shuttle cars 50 and 51 from the positions shown in FIG. 4 to the positions shown in FIG. 5, with this structure being shown particularly in FIGS. 6, 7 and 8. This structure embodies a double-acting fluid cylinder 90 connected to a member 91 by a bracket 92, with the member 91 having a rotatably-mounted sprocket 93 engaging a chain 94 intermediate the ends thereof. One end of the chain 94 is permanently secured at 95 and the other end is connected at 96 to a movable block 97 which is movable along a dovetail way 98. This block 97 provides a sliding support for the member 91, as shown in FIG. 8. A tension spring 99 connects the block 97 and the member 91 to cause return of the block 97 when the member 91 moves toward the left, as viewed in FIG. 6. The block 97 carries a pair of spring-urged drive dogs 100 engageable with the pin 65 of the shuttle cars 50 and 51, whereby upon extension of the cylinder the block 97 is moved toward the right and the drive dogs 100 shift the shuttle cars 50 and 51 to the positions shown in FIG. 5. The drive train from the cylinder to the dogs provides a multiplication of movement of the cylinder for fast action of the drive dogs. The movable rail member 45 is provided with a series of pin-engaging spring detents located at 101, 102 and 103, defining, respectively, first, second and third shuttle car holding positions, whereby the detents 101 and 102 hold the shuttle cars 50 and 51 prior to the tool change at the first and second positions, as shown in FIG. 4, and the detents 102 and 103 hold these two shuttle cars at second and third positions, respectively, after the tool change and as shown in FIG. 5.

Means are also provided to move a shuttle car from the tool-holding station preceding the rail end 47 into engagement with detent 101 at the first position on the movable rail member 45. This means also includes structure for transferring a shuttle car from the third position on the movable rail member, as defined by the detent 103, back onto the rail member 46 beyond the end 48 thereof. This means includes a motor 110 (FIG. 7) driving a shaft 111 having an eccentric pin 112 mounted on a rotatable disk 113 engageable in a slot 114 extending along the length of an actuating link 115. This actuating link is floatingly pivoted near its lower end by engagement with a pivot pin 116, located in a slot 117 in the link. The lower end of the link is pivoted at 118 to a motion-transmitting link 119, which extends to a location underlying the tool-holding station and is pivotally connected at 120 to a lever 121 pivoted at 122. The lever 121 has its opposite end carrying a pin 123 engageable within a slot 124 in a link 125, pivoted to the frame at 126.

The link 115, at its upper end, is pivotally connected at 130 to a slide 131, movably mounted on a way 132, adjacent the end of the rail 46 and also movable along the way 98 associated with the movable rail member, which coincides with the way 132 when the tool transfer arm 36 is at the extension station. The slide 131 carries a pivoted drive dog 133, which is engageable behind a pin 65 of a shuttle car at position 3 on the movable rail transfer arm and can advance this car to a position on the rail 46 where the car awaits the advance of the next car from the movable rail member. The car previously advanced is then pushed to a location along the rail where a drive dog 83 on the chain 75 can engage the drive pin 65 on the car and move the car along the rail 46. Simultaneously with the movement of the slide 131 to the left, as viewed in FIGS. 6 and 7, to pick up a car at the third location on the movable rail member, the link 125 will be causing advance of a slide 140 on a way member 141 extending along the rail 46 at the tool-holding station. This movement is caused by clockwise pivoting of the link 125 and its connection to the slide 140 by a pin and slot connection 142. The way member 141 connects with the way 98 on the tool transfer arm, so that the slide 140 can move the necessary distance to cause a spring-loaded dog 145 mounted at the top of the slide 140 to engage the drive pin 65 on a shuttle car and advance it to the first location on the tool transfer member 36. The drive dog 145 is at an elevation different from the drive dog 100 on the block 97 carried on the transfer arm whereby the drive dogs will not interfere during the advance of the drive dog 145.

The operation of the tool changer can now be described in conjunction with a sequential tool selection system. With a sequential tool selection system, it is provided that the tools, in their respective shuttle cars, will be positioned along the rail 46 in the order in which they are to be used. Thus, successive tools moving to the tool-holding station will then be moved onto the tool supporting movable rail member 45 for use as a replacement in a spindle of the machine tool. The desired tools and their shuttle cars are placed on the rail 46 in the desired order by manually positioning them on the rail, with the cars then retaining their position. The chain 75 then commences operation, as driven by the motor 81 to progressively move the shuttle cars to a position in which the leading car is at the tool-holding station adjacent the end 47 of the rail. The motor 110 then operates to cycle the slides 131 and 140, coacting with the ends of the guide rail 46, whereby a shuttle car is moved into the first position at detent 101 on the movable rail member 45. There will be an empty car at the second position, defined by detent 102, on the movable rail member which will subsequently receive a spindle plug from one of the spindles of the machine tool. The transfer arm 36 is then operated by actuation of the drive motor 40 therefor and the movable rail member 45 is advanced to a position beneath the selected spindle 25 or 26 and during the final part of the advance, the shuttle car at the second position on the rail member moves onto and grips the plug in the selected spindle. The spindle is then elevated to a noninterfering position with the tools in the shuttle cars and the cylinder 90 on the transfer arm 36 is then actuated to shift the shuttle cars to the second and third position on the movable rail member, whereby the replacement tool is in alignment with the spindle. The spindle descends to receive the replacement tool and the transfer member 36 then returns to the tool transfer station with the initial movement separating the tool and its car. This results in an empty shuttle car at the second location and the car with the spindle plug at the third position on the movable rail member.

The motor 110 again operates to move a new shuttle car into the first position on the movable rail member by means of slide 140 and to remove the spindle plug and the supporting car therefor from the movable rail 45 and onto the rail 46 by actuation of the slide 131. With the withdrawal of a car from the tool-holding station, the motor 81 again commences operation to progress the shuttle cars along the guide rail 46 until the limit switch 82 opens to stop the operation of the motor. At a desired time, the tool change cycle is repeated and the tool transfer arm 36 again moves to a position adjacent the spindle, with the empty car at the second position on the movable rail member moving directly onto the tool held by the spindle, to again receive the tool and subsequently carry it to and through the magazine. It will be seen that the critical location for a tool and shuttle car is at the second position on the movable rail member and the tool always has its axis aligned with the spindle because of the fixed relation between the center of the tool and the drive pin 65 of the shuttle car which engages the locating detent 102.

From the foregoing, it will be seen that a tool changing system has been provided in which a substantially unlimited capacity of tools can all be held in an upright position at eye level for loading and unloading. The retention of the tools in a vertical position enables simple holding thereof by the structure of the shuttle cars. With this structure, it is not necessary to shift the entire magazine and, therefore, a large mass, which would result in a slow operation. Only that part of a magazine which holds a particular tool need be shifted, and with the simplest possible transfer structure.

As an auxiliary feature of the construction, an auxiliary rail 160, shown in elevated operative position in FIG. 2, can be positioned in the place of movable rail member 45 during a tool transfer operation. This auxiliary rail 160 thus forms a continuation of the track 46 and maintains the tool magazine as a closed loop. This auxiliary rail is shown in operative position in FIGS. 2 and 5 and in retracted inoperative position in broken line in FIG. 1. The auxiliary rail 160 has brackets 161 and 162, at its opposite ends, each of which connect to a pair of arms 163 and 164 of a parallelogram linkage. The arms have one of their ends pivotally connected to the brackets 161 and 162 and their opposite ends pivotally connected to the frame of the pedestal 30. The position of the auxiliary rail is controlled by a fluid cylinder 165 pivotally connected to the frame of pedestal 30 and having a rod 166 connected to a crossbar 167 extending between the lower parallelogram arms 163. With the auxiliary rail 160 in an inoperative position, the movable rail member 45 forms a continuation of the rail 46 for a closed loop magazine. During the time that the tool transfer arm 36 and movable rail member 45 are away from the tool transfer station, the auxiliary rail 160 can be moved upwardly into position to close off the opening in the rail and, if desired, permit indexing of shuttle cars and associated tools. In order to convey shuttle cars along the auxiliary rail 160, an advancing mechanism is associated with the auxiliary rail as indicated generally at 170, with this mechanism being similar to that associated with the movable rail member 45 and including a fluid cylinder and associated structure including drive dogs 171 and 172 which move shuttle cars along the auxiliary rail. The stroke of the dogs 171 and 172 would be longer than that of the dogs 100 in order to carry a shuttle car well off the auxiliary rail and onto the leading end of the rail 46.

I claim:

1. A tool changing mechanism for a machine tool having a spindle which uses a plurality of tools in successive machining operations comprising, a plurality of tool mounting magazine elements with there being a tool on each element, means for moving said elements along a magazine path including through a tool extension station, means at said station for shifting an element out of the magazine path to a position coaxial with said spindle whereby a tool can be transferred directly from the element to the spindle.

2. A mechanism as defined in claim 1 in which said shifting means shifts a pair of magazine elements with one element positioned upon transfer to the position coaxial with the spindle to receive a tool from the spindle, means for shifting said one element from said position and a second element carrying a replacement tool to the position previously occupied by the one element whereby the replacement tool is positioned for acceptance by the spindle.

3. A mechanism as defined in claim 1 wherein said magazine path is defined by a supporting rail, a movable member forming a section of said rail at the tool extension station, and means extending along said rail for advancing magazine elements therealong to and through the tool extension station.

4. A tool changer as defined in claim 3 in which said magazine element has a base member with depending rollers engageable with said rail for movably supporting the element on the rail, a recess in said base member for releasably holding a tool, and coacting means on the element and advancing means for advancement and positioning of an element, said latter means including a surface on the element aligned with the center line of a tool carried by the element whereby said surface is an accurate locator for a tool.

5. A tool changer for a machine tool comprising, a plurality of shuttle cars for individually each supporting a tool, a continuous loop storage for said cars including a car supporting rail, a tool transfer station along said loop including a movable rail member, car advancing mechanism extending along a major part of said rail for intermittently advancing cars to and from said transfer station comprising an endless chain with car-engaging pushers along the length thereof, and reciprocable conveying means adjacent opposite ends of said movable rail member for advancing a car onto one end of said member and removing a car from the other end of said member.

6. A tool changer for a machine tool having a spindle comprising, a tool storage magazine having a plurality of elements each having a tool, means for indexing said elements to present a desired tool and element at a transfer station, and means for shifting a part of the magazine at the transfer station with a tool from a position out of alignment with the spindle to a position aligned with said spindle for the purpose of changing tools.

7. A tool changer as defined in claim 6 in which said shifting means shifts two elements with one element being empty to receive a tool from the spindle prior to spindle insertion of the replacement tool from the other element.

8. A tool changer as defined in claim 7 including means to shift the previously empty element after a tool is positioned therein from the tool change location and shift the element with the replacement tool into the tool change location.

9. A tool changer as defined in claim 7 in which each of said elements has a tool gripper with a pair of spaced arms with an open-ended slot therebetween to hold a tool with its axis transverse to a plane defined by said arms whereby said element in moving toward a machine tool spindle will cause the tool to be engaged thereby.

10. A tool changer for use with a machine tool having a spindle comprising, a plurality of tool carriers each having a particular tool associated therewith, a magazine for said tool carriers and associated tools including a guide mechanism along which said carriers can move, a portion of said guide mechanism including a movable transfer member at a tool transfer station in said magazine and having a first location forming a continuation of said guide mechanism to define a closed loop magazine for the carriers and a second location adjacent the spindle, means for indexing carriers along said guide mechanism with the transfer member at the first location, means for locating a particular carrier at a point in advance of said movable guide member, and means for moving said last mentioned carrier onto the movable guide member.

11. A tool changer as defined in claim 10 wherein an auxiliary guide member is normally out of operative position, and means mounting said auxiliary guide member for movement into operative association with said guide mechanism when the movable guide member is out of position to maintain the closed loop magazine for indexing of carriers.

12. A tool changer for use with a machine tool comprising a magazine disposed in a generally horizontal plane and having a rail defining the shape of the magazine with a part of the rail at a tool transfer station being movable, a plurality of shuttle cars associated with said rail, each car having a generally planar base with an open-ended notch for holding a tool generally upright and to one side of the rail, rollers on each car movably mounting the care to the rail, a locating pin on each car in a fixed position relative to the axis of a tool carried by the car, means in advance of the movable rail engageable with said pin of a car, and means at spaced locations on the movable rail for engaging the pins on two successive cars to hold them in known positions with one position directly related to a machine tool spindle when the movable rail is moved to a position adjacent the spindle.

13. A tool changer as defined in claim 12 in which said movable rail has means at three spaced locations engageable with car pins to locate and hold cars, and a shuttle mechanism on said movable rail for shifting cars from a first and second of said locations to second and third locations respectively whereby a car initially at said second location receives a tool from the spindle and the succeeding car at the second location provides a replacement tool for the spindle.

14. A tool changer for use with a machine tool having a spindle comprising, a tool magazine in the form of an elongate rail and a plurality of cars movable along said rail, means for moving cars along said rail including a series of drive members at spaced locations along the rail engageable with cars to move them along, a section of said rail being defined by a movable rail member at a tool transfer station, said movable rail member having a length sufficient to hold three spaced apart cars, means mounting said movable rail member for movement between a position at the tool transfer station and a tool change position adjacent the spindle, means associated with the rail at both the entry and exit ends of the movable rail member for moving cars onto and off the movable rail member respectively, and means on the movable rail member for shifting cars at first and second positions thereon to second and third positions respectively whereby one car can receive a tool from the spindle and the next car deliver a tool to the spindle independently of said car moving means.

15. A tool changer as defined in claim 14 wherein the car moving means and car shifting means both include reciprocal drive dogs.

16. A tool changer for use with a machine tool having a spindle comprising, a tool magazine in the form of an elongate rail and a plurality of cars of different sizes movable along said rail, each of said cars having roller means engageable with said rail, means for moving cars along said rail including an endless chain with drive dogs at spaced locations along the length thereof engageable with cars to move them along with cars abutting each other, said endless chain paralleling a portion of the rail length, a section of said rail being defined by a movable rail member at a tool transfer station, said movable rail member having a length sufficient to hold three spaced apart tool cars, means mounting said movable rail member for movement between a position at the tool transfer station and a tool change position adjacent the spindle, reciprocable means associated with the rail at the entry and exit ends of the movable rail member for moving cars onto and off the movable rail member respectively, and reciprocable means on the movable rail member for shifting cars at first and second positions thereon to second and third positions respectively whereby one car can receive a tool from the spindle and the next car deliver a tool to the spindle independently of said endless chain car moving means.

17. A shuttle car for a tool changer including a base, means on said base for holding a tool in association with said car, guiding means on said base and adapted for engagement with and movement along a guiding rail of a magazine, and means on said base related to the axis of a tool held by the tool holding means for accurate location of said car.

18. A shuttle car as defined in claim 17 wherein said guiding means support said shuttle car for movement independent of adjacent cars.

19. A shuttle car as defined in claim 17 wherein said tool holding means is defined by an open-ended notch.

20. A shuttle car as defined in claim 17 in which said base has tool coding means carried thereon.

References Cited
UNITED STATES PATENTS 3,191,260    6/1965    Jorgensen _____ 29—568
3,073,024    1/1963    Hutchens _____ 29—568

RICHARD H. EANES, JR., *Primary Examiner.*